(12) United States Patent
Matsunaga et al.

(10) Patent No.: US 12,479,939 B2
(45) Date of Patent: Nov. 25, 2025

(54) RELEASE AGENT AND METHOD OF PRODUCING RESIN PRODUCT

(71) Applicant: Harima Chemicals, Incorporated, Kakogawa (JP)

(72) Inventors: Yoko Matsunaga, Kakogawa (JP); Takumi Miyazaki, Kakogawa (JP)

(73) Assignee: HARIMA CHEMICALS, INCORPORATED, Kakogawa (JP)

( * ) Notice: Subject to any disclaimer, the term of this patent is extended or adjusted under 35 U.S.C. 154(b) by 688 days.

(21) Appl. No.: 17/793,667

(22) PCT Filed: Jan. 15, 2021

(86) PCT No.: PCT/JP2021/001156
§ 371 (c)(1),
(2) Date: Jul. 19, 2022

(87) PCT Pub. No.: WO2021/157318
PCT Pub. Date: Aug. 12, 2021

(65) Prior Publication Data
US 2023/0054639 A1    Feb. 23, 2023

(30) Foreign Application Priority Data
Feb. 6, 2020    (JP) .................. 2020-018482

(51) Int. Cl.
*C08F 220/06*    (2006.01)
*C08F 220/68*    (2006.01)

(52) U.S. Cl.
CPC .......... *C08F 220/06* (2013.01); *C08F 220/68* (2013.01)

(58) Field of Classification Search
None
See application file for complete search history.

(56) References Cited

U.S. PATENT DOCUMENTS

| 5,516,865 A | 5/1996 | Urquiola |
| 2016/0002377 A1* | 1/2016 | Chang .................. C09D 183/08 524/730 |
| 2020/0199276 A1 | 6/2020 | Uehata et al. |

FOREIGN PATENT DOCUMENTS

| CN | 103613717 A | 3/2014 |
| CN | 103732640 A | 4/2014 |
| CN | 105745272 A | 7/2016 |
| JP | S55069660 A | 5/1980 |
| JP | H06-055545 A | 3/1994 |
| JP | H08-169919 A | 7/1996 |
| JP | H09-003144 A | 1/1997 |
| JP | H10513212 A | 12/1998 |

(Continued)

OTHER PUBLICATIONS

Notice of Reasons for Refusal issued Jun. 13, 2023, by the Japan Patent Office in corresponding Japanese Patent Application No. 2020-018482 and an English translation of the Notice. (6 pages).

(Continued)

*Primary Examiner* — Richard A. Huhn
(74) *Attorney, Agent, or Firm* — BUCHANAN INGERSOLL & ROONEY PC

(57) ABSTRACT

A release agent contains a polymer of a polymerizable component containing a (meth)acrylate having a long-chain alkyl group with carbon atoms of 12 to 22 and an acid group-containing ethylenic unsaturated bond-containing monomer, wherein an acid group is neutralized by ammonia and/or amines.

17 Claims, 1 Drawing Sheet

Example of grade C

Example of grade B

Example of grade A

(56) References Cited

FOREIGN PATENT DOCUMENTS

| JP | 2004-010643 | A | | 1/2004 | | |
|---|---|---|---|---|---|---|
| JP | 2012188493 | A | | 10/2012 | | |
| JP | 2014129517 | A | | 7/2014 | | |
| JP | 2018-095888 | A | | 6/2018 | | |
| JP | 2018-103579 | A | | 7/2018 | | |
| JP | 2019026836 | A | | 2/2019 | | |
| JP | 2019084803 | A | | 6/2019 | | |
| WO | 2006071442 | A1 | | 7/2006 | | |
| WO | 2009/104569 | A1 | | 8/2009 | | |
| WO | WO-2019039264 | A1 | * | 2/2019 | ............. | B32B 27/36 |

OTHER PUBLICATIONS

International Preliminary Report on Patentability, Written Opinion of the International Searching Authority, Notification Concerning Transmittal of the International Preliminary Report on Patentability, and Notification of Transmittal of Translation of the International Preliminary Report on Patentability (Forms PCT/IB/373, PCT/ISA/237, PCT/IB/326, and PCT/IB/338) issued on Jul. 28, 2022, by the International Bureau of WIPO in corresponding International Patent Application No. PCT/JP2021/001156. (10 pages).

International Search Report (PCT/ISA/210) with translation and Written Opinion (PCT/ISA/237) mailed on Mar. 23, 2021, by the Japanese Patent Office as the International Searching Authority for International Application No. PCT/JP2021/001156. (9 pages).

* cited by examiner

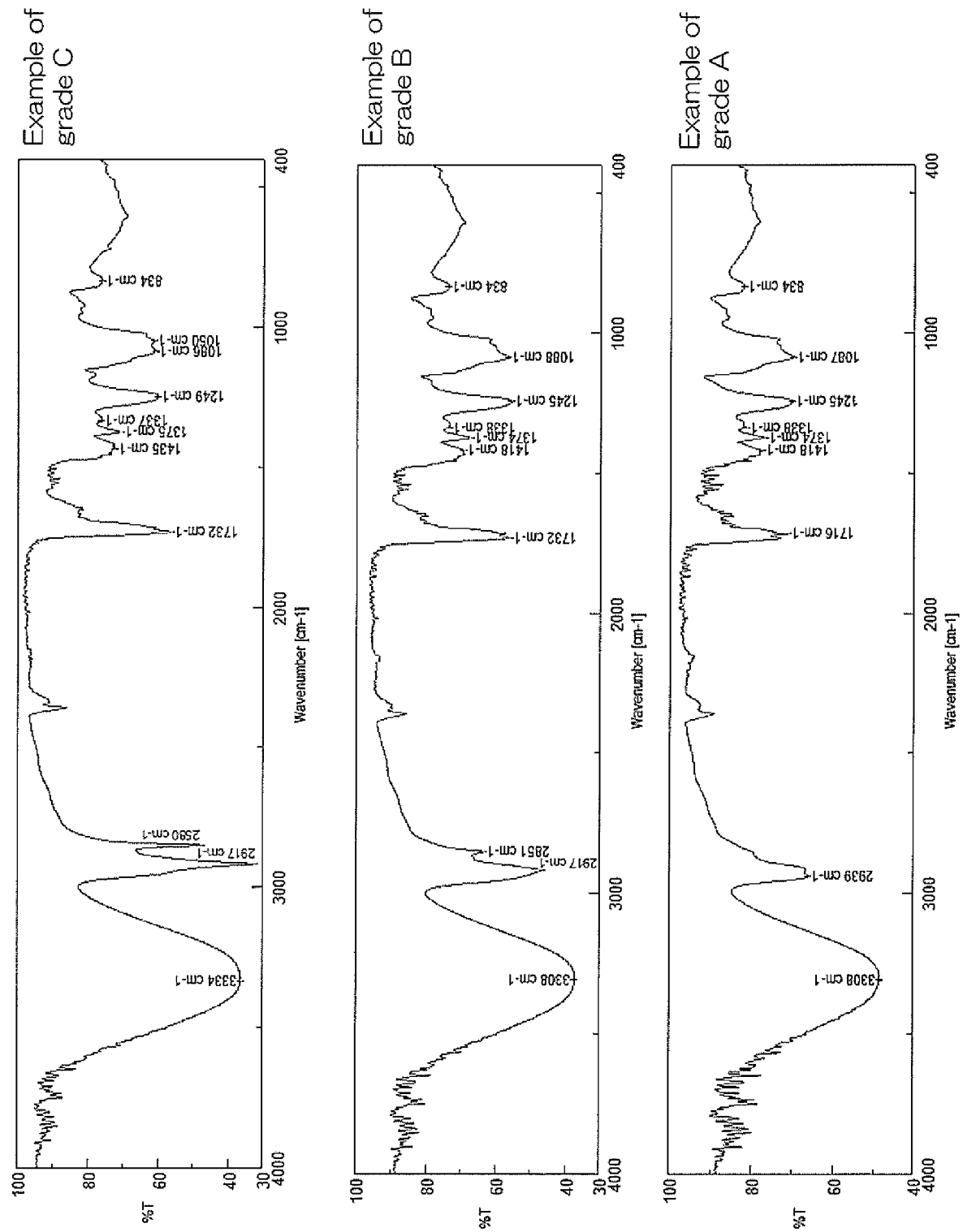

RELEASE AGENT AND METHOD OF PRODUCING RESIN PRODUCT

The present invention relates to a release agent and a method of producing a resin product, and, in detail, to a release agent and a method of producing a resin product using the release agent.

BACKGROUND ART

Conventionally, a resin film has been produced by, for example, a method (solution film forming method) where an aqueous solution of a resin for films is applied and dried on a metal base material such as a stainless drum.

Further, for the method, it has been known to apply a release agent (such as a peeling accelerator or a demolding agent) to the metal base material to form a release film so as to facilitate the peeling of the resin film from the metal base material.

Examples of the release agent include aqueous latex polymer compositions. More specifically, an aqueous latex polymer composition containing latex particles obtained by a polymerization of a monomer such as octadecyl acrylate, methyl acrylate, acrylonitrile, or acrylic acid in the presence of an emulsifier such as sodium dodecylbenzenesulfonate or sodium alkyl allyl sulfosuccinate has been proposed (for example, see Patent Document 1 (Examples 1 to 3)).

CITATION LIST

Patent Document

Patent Document 1: Japanese Translation of PCT International Application Publication No. H10-513212

SUMMARY OF THE INVENTION

Problem to be Solved by the Invention

However, the release film formed from the above-described aqueous latex polymer includes sodium ions and thus has a relatively high hydrophilicity and a relatively low water-resistant property.

Thus, when an aqueous solution of a resin for films is applied to the release film formed from the above-described aqueous latex polymer, the release film may be leached into the aqueous solution of a resin for films and may cause contamination of the resin film.

Further, this makes it difficult to peel the resin film from the release film and may cause damage (a crease or breakage) to the resin film.

The present invention provides a release agent that can form a release film with excellent water-resistant property and excellent releasability and suppress the contamination and damage to the resin product, and a method of producing a resin product using the release agent.

Means for Solving the Problem

The present invention [1] includes a release agent comprising: a polymer of a polymerizable component containing a (meth)acrylate having a long-chain alkyl group with carbon atoms of 12 to 22 and an acid group-containing ethylenic unsaturated bond-containing monomer, wherein the acid group is neutralized by ammonia and/or amines.

The present invention [2] includes the release agent described in [1], wherein the polymer has a glass transition temperature of 25° C. or more.

The present invention [3] includes the release agent described in [1] or [2], wherein the polymer has an acid value of 80 mgKOH/g or more and 200 mgKOH/g or less.

The present invention [4] includes the release agent described in any one of the above-described [1] to [3], wherein the polymer has a weight-average molecular weight of 3,000 or more and 220,000 or less.

The present invention [5] includes the release agent described in any one of the above-described [1] to [4], wherein the acid group is neutralized by ammonia.

The present invention [6] includes the release agent described in any one of the above-described [1] to [5], wherein a percentage of neutralization of the acid group is 60 mol % or more.

The present invention [7] includes the release agent described in any one of the above-described [1] to [6], wherein the acid group-containing ethylenic unsaturated bond-containing monomer contains a phosphate group-containing (meth)acrylate.

The present invention [8] includes the release agent described in any one of the above-described [1] to [7], wherein a ratio of the acid group-containing ethylenic unsaturated bond-containing monomer to a total amount of the polymerizable component is 5% by mass or more and 25% by mass or less.

The present invention [9] includes the release agent described in any one of the above-described [1] to [8], the release agent being used to shape a polar group-containing resin.

The present invention [10] includes a method of producing a resin product, the method comprising: a step of forming a release film of the release agent described in any one of the above-described [1] to [9] on a surface of the metal base material; a step of shaping a polar group-containing resin while the polar group-containing resin is in contact with the release film; and a step of releasing a product of the polar group-containing resin from the metal base material.

Effects of the Invention

The release agent of the present invention includes a polymer having an acid group neutralized by ammonia and/or amines in a polymer of a polymerizable component containing a (meth)acrylate including a long-chain alkyl group and an acid group-containing ethylenic unsaturated bond-containing monomer.

Thus, the polymer in the release agent has affinity for a metal base material, which is derived from the acid group, and separability from a polar group-containing resin, which is derived from the long-chain alkyl group.

The acid group of the release agent is neutralized by ammonia and/or amines. The ammonia and/or amines are easily volatilized and removed during the drying of the release agent. Thus, the release agent having the acid group neutralized by ammonia and/or amines allows for the formation of a release film having an excellent water-resistant property and an excellent releasability in comparison with a release agent having the acid group neutralized by sodium ions that are difficult to volatilize.

As a result, the release agent of the present invention can suppress contamination and damage to the resin product made of the polar group-containing resin.

The method for producing a resin product of the present invention uses the above-described release agent, and thus can suppress contamination and damage to the resin product.

BRIEF DESCRIPTION OF THE DRAWINGS

FIG. 1 shows a specific example of the IR chart on a grading scale of A to C for the evaluation of the product contamination resistance.

DESCRIPTION OF THE EMBODIMENTS

For the present invention, a release agent is defined as a demolding agent and/or a peeling accelerator, and release is defined as demolding and/or peeling.

In other words, the release agent of the present invention is a coating agent for coating a surface of a metal base material described below, and a composition for suppressing the adherence of a polar group-containing resin (described below) to a surface of the metal base material (described below).

The release agent of the present invention includes a neutralized product of a (meth)acrylic resin. More specifically, the release agent includes a polymer (polymer neutralized product) having an acid group neutralized by ammonia and/or amines in a polymer of a polymerizable component described below.

Hereinafter, the term "(meth)acryl" is defined as "acryl" and/or "methacryl". The term "(meth)acrylate" is defined as "acrylate" and/or "methacrylate".

The polymerizable component is a composition including a monomer to form a polymer. The polymerizable component includes a (meth)acrylate having a long-chain alkyl group with carbon atoms of 12 to 22 and an acid group-containing ethylenic unsaturated bond-containing monomer as essential components.

Examples of the (meth)acrylate having a long-chain alkyl group with carbon atoms of 12 to 22 (hereinafter, referred to as long-chain alkyl (meth)acrylate) include straight-chain long-chain alkyl (meth)acrylates such as lauryl (meth)acrylate (alkyl carbon number of 12), tridecyl (meth)acrylate (alkyl carbon number of 13), tetradecyl (meth)acrylate (alkyl carbon number of 14), pentadecyl (meth)acrylate (alkyl carbon number of 15), hexadecyl (meth)acrylate (alkyl carbon number of 16), octadecyl (meth)acrylate (stearyl (meth)acrylate) (alkyl carbon number of 18), eicosyl (meth)acrylate (alkyl carbon number of 20), behenyl (meth)acrylate (alkyl carbon number of 22), branched long-chain alkyl (meth)acrylates such as 2,2-dimethyllauryl (meth)acrylate (alkyl carbon number of 14), 2,3-dimethyllauryl (meth)acrylate (alkyl carbon number of 14), 2,2-dimethylstearyl (meth)acrylate (alkyl carbon number of 20), 2,3-dimethylstearyl (meth)acrylate (alkyl carbon number of 20), 2,2-dimethyleicosyl (meth)acrylate (alkyl carbon number of 22), 2,3-dimethyleicosyl (meth)acrylate (alkyl carbon number of 22), and cyclic long-chain alkyl (meth)acrylates such as cyclododecyl (meth)acrylate (alkyl carbon number of 12).

These long-chain alkyl (meth)acrylates can be used singly, or can be used in combination of two or more.

As the long-chain alkyl (meth)acrylate, a straight long-chain alkyl (meth)acrylate is preferable.

Further, as the long-chain alkyl (meth)acrylate, a (meth)acrylate having a long-chain alkyl group with carbon atoms of 12 to 20 is preferable, a (meth)acrylate having a long-chain alkyl group with carbon atoms of 12 to 18 is more preferable, a (meth)acrylate having a long-chain alkyl group with carbon atoms of 14 to 18 is even more preferable, and a stearyl (meth)acrylate is particularly preferable.

When the carbon atoms of the long-chain alkyl (meth)acrylate is the above-described lower limit or more, excellent separability from a polar group-containing resin (described below) is achieved.

When the carbon atoms of the long-chain alkyl (meth)acrylate is the above-described upper limit or less, excellent coating properties on a metal base material (described below) is achieved.

To achieve excellent product contamination resistance, the content ratio of the long-chain alkyl (meth)acrylate to the total amount of the polymerizable component is, for example, 5% by mass or more, preferably 10% by mass or more, more preferably 20% by mass or more, even more preferably 25% by mass or more, and, for example, 90% by mass or less, preferably 80% by mass or less, more preferably 70% by mass or less, even more preferably 60% by mass or less, even more preferably 50% by mass or less, even more preferably 40% by mass or less, particularly preferably 25% by mass or less.

The acid group-containing ethylenic unsaturated bond-containing monomer contains an acid group such as a carboxy group, a phosphate group, or a sulfonate group. These can be contained singly, or can be contained in combination of two or more.

In other words, examples of the acid group-containing ethylenic unsaturated bond-containing monomer include a carboxy group-containing ethylenic unsaturated bond-containing monomer, a phosphate group-containing ethylenic unsaturated bond-containing monomer, and a sulfonate group-containing ethylenic unsaturated bond-containing monomer.

Examples of the carboxy group-containing ethylenic unsaturated bond-containing monomer include $\alpha,\beta$-unsaturated carboxylic acids such as (meth)acrylic acid, itaconic acid, itaconic acid anhydride, maleic acid, maleic acid anhydride, fumaric acid, crotonic acid, cinnamic acid, citraconic acid, citraconic acid anhydride, mesaconic acid, glutaconic acid or a salt thereof, and $\omega$-carboxy caprolacton monoacrylate.

These carboxy group-containing ethylenic unsaturated bond-containing monomers can be used singly, or can be used in combination of two or more.

As the carboxy group-containing ethylenic unsaturated bond-containing monomer, $\alpha,\beta$-unsaturated carboxylic acid is preferable, and (meth)acrylic acid is more preferable.

Examples of the phosphate group-containing ethylenic unsaturated bond-containing monomer include phosphate group-containing (meth)acrylates such as 2-(meth)acryloyloxy ethyl acid phosphate (also known as: acid phosphooxy ethyl (meth)acrylate), mono(2-hydroxyethyl (meth)acrylate) phosphate, and propyl propylene glycol monomethacryl acidphosphate.

These phosphate group-containing ethylenic unsaturated bond-containing monomers can be used singly, or can be used in combination of two or more.

As the phosphate group-containing ethylenic unsaturated bond-containing monomer, a phosphate group-containing (meth)acrylate is preferable, and 2-(meth)acryloyloxy ethyl acid phosphate is more preferable.

Examples of the sulfonate group-containing ethylenic unsaturated bond-containing monomer include 2-acrylamide-2-methylpropanesulfonic acid, and vinyl sulfonic acid.

These sulfonate group-containing ethylenic unsaturated bond-containing monomers can be used singly, or can be used in combination of two or more.

These acid group-containing ethylenic unsaturated bond-containing monomers can be used singly, or can be used in combination of two or more.

To adjust the acid value within a range described below and achieve excellent water-resistant property, releasability, and product contamination resistance, the content ratio of the acid group-containing ethylenic unsaturated bond-containing monomer to the total amount of the polymerizable component is, for example, 1% by mass or more, preferably 5% by mass or more, more preferably 8% by mass or more, even more preferably 10% by mass or more, and, for example, 40% by mass or less, preferably 35% by mass or less, more preferably 25% by mass or less, even more preferably 20% by mass or less.

Further, in view of the coating properties on a metal base material, the acid group-containing ethylenic unsaturated bond-containing monomer contains preferably a carboxy group-containing ethylenic unsaturated bond-containing monomer, more preferably (meth)acrylic acid, and even more preferably acrylic acid.

The acid group-containing ethylenic unsaturated bond-containing monomer can contain only a carboxy group-containing ethylenic unsaturated bond-containing monomer.

When the acid group-containing ethylenic unsaturated bond-containing monomer contains a carboxy group-containing ethylenic unsaturated bond-containing monomer, the content ratio of the carboxy group-containing ethylenic unsaturated bond-containing monomer to the total amount of the acid group-containing ethylenic unsaturated bond-containing monomer is, for example, 0.1% by mass or more, preferably 1% by mass or more, more preferably 5% by mass or more, and, for example, 100% by mass or less, preferably 50% by mass or less, more preferably 25% by mass or less, even more preferably 10% by mass or less.

Further, in view of the water-resistant property and releasability of the release film (described below), the acid group-containing ethylenic unsaturated bond-containing monomer contains preferably a phosphate group-containing ethylenic unsaturated bond-containing monomer, and more preferably a phosphate group-containing (meth)acrylate.

The acid group-containing ethylenic unsaturated bond-containing monomer particularly preferably contains a carboxy group-containing ethylenic unsaturated bond-containing monomer and a phosphate group-containing ethylenic unsaturated bond-containing monomer in combination.

When the acid group-containing ethylenic unsaturated bond-containing monomer contains a phosphate group-containing ethylenic unsaturated bond-containing monomer, the content ratio of the phosphate group-containing ethylenic unsaturated bond-containing monomer to the total amount of the acid group-containing ethylenic unsaturated bond-containing monomer is, for example, 0.1% by mass or more, preferably 1% by mass or more, more preferably 5% by mass or more, and, for example, 100% by mass or less, preferably 50% by mass or less, more preferably 25% by mass or less, even more preferably 10% by mass or less.

To adjust the glass transition temperature (described below) of the produced polymer, the polymerizable component can contain a (meth)acrylate having a short-chain alkyl group with carbon atoms of 11 or less as an optional component.

Examples of the (meth)acrylate having a short-chain alkyl group with carbon atoms of 11 or less (hereinafter, referred to as short-chain alkyl (meth)acrylate) include straight short-chain alkyl (meth)acrylates such as methyl (meth)acrylate, ethyl (meth)acrylate, n-propyl (meth)acrylate, n-butyl (meth)acrylate, pentyl (meth)acrylate, hexyl (meth)acrylate, heptyl (meth)acrylate, octyl (meth)acrylate, nonyl (meth)acrylate, isononyl (meth)acrylate, decyl (meth)acrylate, and dodecyl (meth)acrylate, branched short-chain alkyl (meth)acrylates such as isopropyl (meth)acrylate, isobutyl (meth)acrylate, s-butyl (meth)acrylate, t-butyl (meth)acrylate, neopentyl (meth)acrylate, isoamyl (meth)acrylate, isooctyl (meth)acrylate, 2-ethylhexyl (meth)acrylate, and isononyl (meth)acrylate, and cyclic short-chain alkyl (meth)acrylates such as cyclohexyl (meth)acrylate, isobornyl (meth)acrylate, dicyclopentenyl (meth)acrylate, and methyladamantyl (meth)acrylate. These can be used singly, or can be used in combination of two or more.

As the short-chain alkyl (meth)acrylate, a straight short-chain alkyl (meth)acrylate, and a cyclic short-chain alkyl (meth)acrylate are preferable.

As the short-chain alkyl (meth)acrylate, a short-chain alkyl (meth)acrylate that increases the glass transition temperature (described below) of a polymer is preferable.

Examples of the short-chain alkyl (meth)acrylate that increases the glass transition temperature (described below) of a polymer include methyl methacrylate, isobornyl acrylate, and isobornyl methacrylate. These can be used singly, or can be used in combination of two or more.

To improve the water-resistant property while increasing the glass transition temperature (described below) of the polymer, isobornyl (meth)acrylate is more preferable, and isobornyl methacrylate is even more preferable as the short-chain alkyl (meth)acrylate.

By using isobornyl methacrylate to increase the glass transition temperature of the polymer (described below), the water-resistant property of the release film (described below) is improved in comparison with the use of methyl methacrylate or the like.

When the polymerizable component contains a short-chain alkyl (meth)acrylate, the content ratio of the short-chain alkyl (meth)acrylate to the total amount of the polymerizable component is, for example, 5% by mass or more, preferably 10% by mass or more, more preferably 20% by mass or more, even more preferably 40% by mass or more, and, for example, 80% by mass or less, preferably 70% by mass or less, more preferably 60% by mass or less.

Further, examples of the optional component that the polymerizable component can contain include an ethylenic unsaturated bond-containing monomer containing an aromatic ring and an ethylenic unsaturated bond-containing monomer containing a hydroxyl group.

Examples of the ethylenic unsaturated bond-containing monomer containing an aromatic ring include aromatic ring-containing (meth)acrylates such as phenyl (meth)acrylate, benzil (meth)acrylate, phenoxyethyl (meth)acrylate, (meth)acrylic acid phenoxydiethylene glycol, o-phenylphenoxyethyl (meth)acrylate, and phenoxybenzil (meth)acrylate, and styrene monomers such as styrene, and α-methylstyrene. These can be used singly, or can be used in combination of two or more.

When the polymerizable component contains an ethylenic unsaturated bond-containing monomer containing an aromatic ring, the content ratio of the ethylenic unsaturated bond-containing monomer containing an aromatic ring is appropriately set in a range that does not reduce the excellent effects of the present invention, depending on the purpose and use.

Example of the ethylenic unsaturated bond-containing monomer containing a hydroxyl group include hydroxyl group-containing (meth)acrylates such as hydroxymethyl (meth)acrylate, 2-hydroxyethyl (meth)acrylate, 3-hydroxypropyl (meth)acrylate, 1-methyl-2-hydroxyethyl (meth)

acrylate, 2-hydroxypropyl (meth)acrylate, and 4-hydroxybutyl (meth)acrylate. 2-hydroxyethyl (meth)acrylate is preferable. These can be used singly, or can be used in combination of two or more.

When the polymerizable component contains an ethylenic unsaturated bond-containing monomer containing a hydroxyl group, the content ratio of the ethylenic unsaturated bond-containing monomer containing a hydroxyl group is appropriately set in a range that does not reduce the excellent effects of the present invention, depending on the purpose and use.

Further, the polymerizable component can contain a reactive emulsifier as an optional component.

The reactive emulsifier is an emulsifier having a carbon-carbon double bond (C=C) in the molecule.

In other words, the reactive emulsifier is a compound that has emulsification properties, and has a carbon-carbon double bond (C=C) in the molecule.

The carbon-carbon double bond (C=C) is an unsaturated bond contained in a functional group such as an alkenyl group, a (meth)allyloxy alkyl group, or a (meth)acryloyl group.

Examples of the alkenyl group include a vinyl group, a (meth)allyl group, a 1-propenyl group, a 2-methyl-1-propenyl group, and an isopropenyl group. These can be used singly, or can be used in combination of two or more.

These functional groups containing a carbon-carbon double bond (C=C) can be used singly, or can be used in combination of two or more.

Examples of the emulsifier having a carbon-carbon double bond include an emulsifier having the above-described functional group.

More specifically, the examples of the emulsifier having a carbon-carbon double bond include sulfosuccinate of polyoxyethylene alkylether having at least one of the above-described functional groups in the molecule, organosulfate of polyoxyethylene alkylether having at least one of the above-described functional groups in the molecule (such as ester sodium salt and ester ammonium salt), sulfosuccinate of polyoxyethylene alkylphenylether having at least one of the above-described functional groups in the molecule, organosulfate of polyoxyalkylene ether having at least one of the above-described functional groups in the molecule, organosulfate of polyoxyethylene styrenated phenylether having at least one of the above-described functional groups in the molecule, organosulfate of polyoxyethylene alkylphenylether having at least one of the above-described functional groups in the molecule, and an acid (meth)acrylate phosphate dispersant having at least one of the above-described functional groups in the molecule. Further, the examples include an acid anhydride-modified product of rosin glycidyl ester acrylate (Japanese Unexamined Patent Publication No. H4-256429), the dispersant described in Japanese Unexamined Patent Publication No. S63-23725, the dispersant described in Japanese Unexamined Patent Publication No. S63-240931, and the dispersant described in Japanese Unexamined Patent Publication No. S62-104802.

The reactive emulsifier is available as a commercial product. Examples of the commercial product include KAYAMER PM-1 (manufactured by Nippon Kayaku Co., Ltd.), KAYAMER PM-2 (manufactured by Nippon Kayaku Co., Ltd.), KAYAMER PM-21 (manufactured by Nippon Kayaku Co., Ltd.), SE-10N (manufactured by ADEKA Corporation), NE-10 (manufactured by ADEKA Corporation), NE-20 (manufactured by ADEKA Corporation), NE-30 (manufactured by ADEKA Corporation), NEW FRONTIER A229E (manufactured by DKS Co. Ltd.), NEW FRONTIER N-117E (manufactured by DKS Co. Ltd.), NEW FRONTIER N250Z (manufactured by DKS Co. Ltd.), AQUALON RN-20 (manufactured by DKS Co. Ltd.), AQUALON RN-2025 (manufactured by DKS Co. Ltd.), AQUALON BC-1025 (manufactured by DKS Co. Ltd.), AQUALON AR-1025 (manufactured by DKS Co. Ltd.), AQUALON HS-10 (manufactured by DKS Co. Ltd.), AQUALON KH-1025 (manufactured by DKS Co. Ltd.), ELEMINOL JS-2 (manufactured by Sanyo Chemical Industries, Ltd.), LATEMUL K-180 (manufactured by Kao Corporation), and LATEMUL PD-104 (manufactured by Kao Corporation). These can be used singly, or can be used in combination of two or more.

When the polymerizable component contains a reactive emulsifier, the content ratio of the reactive emulsifier to the total amount of the polymerizable component is, for example, 1% by mass or more, preferably 5% by mass or more, and, for example, 20% by mass or less, preferably 15% by mass or less.

The polymer of the above-described polymerizable component can be produced by, for example, polymerizing the above-described polymerizable component by a known method such as solution polymerization, bulk polymerization, or emulsion polymerization.

As the polymerization method, solution polymerization is preferable.

In the solution polymerization, first, the above-described polymerizable component is blended with a known solvent to prepare a monomer solution.

Examples of the solvent include water-based solvents including water; alcohol solvents such as methanol, ethanol, propanol, isopropanol, and butanol; and glycol ether solvents such as ethylene glycol monoethylether and propylene glycol monomethylether.

The examples of the solvent further include non-aqueous organic solvents, for example, petroleum-based hydrocarbon solvents including hexane and mineral spirit; aromatic hydrocarbon solvents including benzene, toluene, and xylene; ketone solvents including acetone, methyl ethyl ketone, methyl isobutyl ketone, diisobutyl ketone, and cyclohexanone; ester solvents including methyl acetate, ethyl acetate, butyl acetate, γ-butyrolactone, and propylene glycol monomethyl ether acetate; and non-protonic polar solvents including N,N-dimethylformamide, N,N-dimethylacetoamide, dimethylsulfoxide, N-methylpyrrolidone, and pyridine.

These solvents can be used singly, or can be used in combination of two or more.

Further, as the solvent, a water-based solvent is preferable, a glycol ether solvent is more preferable, and a propylene glycol monomethylether is even more preferable.

The blending ratio of the solvent to 100 parts by mass of the total amount of the polymerizable component is, for example, 10 parts by mass or more, preferably 30 parts by mass or more, and, for example, 500 parts by mass or less, preferably 100 parts by mass or less.

Next, in this method, the prepared monomer solution is heated in the presence of a known radical polymerization initiator (such as an azo compound or a peroxide compound). This heating induces the radical polymerization of the polymerizable component. In this method, the monomer solution can be blended at one time or in batches.

The conditions for the polymerization depend on, for example, the formulation of the polymerizable component or the type of the radical polymerization initiator. For example, the polymerization is carried out at a polymerization temperature of, for example, 30° C. or more, preferably 60° C. or more, and, for example, 150° C. or less, preferably 120° C. or less, and for a polymerization time of, for example, 2 hours or more, preferably 4 hours or more, and, for example, 20 hours or less, preferably 10 hours or less.

In this manner, a polymer solution of the above-described polymerizable component is produced.

In the above-described polymerization reaction, a chain transfer agent can be added to adjust the weight-average molecular weight of the polymer.

Examples of the chain transfer agent include mercaptans such as t-dodecylmercaptan, n-dodecylmercaptan, n-octylmercaptan, and dodecyl ester mercaptopropionate, cumene, carbon tetrachloride, α-methylstyrene dimer, terpinlone, mercaptoethanol, thioglycolic acid, and a salt thereof. These can be used singly, or can be used in combination of two or more.

As the chain transfer agent, n-dodecylmercaptan is preferable.

The adding ratio of the chain transfer agent is appropriately set to produce a polymer having a desired weight-average molecular weight.

The weight-average molecular weight of the produced polymer is calibrated with standard polystyrene measured with gel permeation chromatograph (GPC). In view of the water-resistant property of the release film (described below), the weight-average molecular weight is, for example, 1,000 or more, preferably 3,000 or more, more preferably 5,000 or more, even more preferably 10,000 or more, and, in view of the releasability, for example, 500,000 or less, preferably 300,000 or less, more preferably 220,000 or less, even more preferably 200,000 or less, particularly preferably 150,000 or less.

The method of measuring the weight-average molecular weight conforms to Examples described below.

Although depending on the weight-average molecular weight of the polymer, the glass transition temperature of the polymer is, for example, −10° C. or more, preferably 0° C. or more, more preferably 10° C. or more, even more preferably 25° C. or more, even more preferably 50° C. or more, even more preferably 80° C. or more, particularly preferably 100° C. or more, and, for example, 200° C. or less, preferably 180° C. or less, more preferably 150° C. or less in view of the releasability.

The glass transition temperature of the polymer is calculated from a FOX formula according to the formulation of the polymerizable component.

The polymer has an acid value of, for example, 10 mgKOH/g or more, preferably 50 mgKOH/g or more, more preferably 80 mgKOH/g or more, even more preferably 100 mgKOH/g or more in view of the releasability and product contamination resistance, and, for example, 300 mgKOH/g or less, preferably 250 mgKOH/g or less, more preferably 200 mgKOH/g or less, even more preferably 150 mgKOH/g or less in view of the water-resistant property, releasability, and product contamination resistance of the release film (described below).

The acid value of the polymer is calculated according to the formulation of the polymerizable component.

The polymer has a C log P (poly) value of, for example, 1.50 or more, preferably 2.50 or more, more preferably 3.00 or more, even more preferably 3.50 or more, and, for example, 6.00 or less, preferably 5.50 or less, more preferably 5.00 or less.

The C log P (poly) value is the sum of the products of the multiplications of the C log P value of the monomer corresponding to each repeat unit of the polymer by the mole fraction of each repeat unit.

The C log P value is a logarithmic value of the partition coefficient (P) of n-octanol/water, and a parameter indicating the degree of hydrophobicity and hydrophilicity.

The C log P values of the monomers are obtained by calculation. More specifically, calculation values of ChemBioDraw Ultra 14.0 (Cambridge corporation) is employed.

The C log P (poly) of the polymer is obtained, for example, from the following formula (1) in conformity to the description of International patent publication No. WO2016/194613.

$$C \log P(\text{Poly}) = C \log P \text{ of Monomer } A \times \text{Composition Ratio of Repeat Unit } A + C \log P \text{ of Monomer } B \times \text{Composition Ratio of Repeat Unit } B + \ldots \quad (1)$$

Next, in this method, the produced polymer is neutralized by a neutralizer consisting of ammonia and/or amines.

Examples of the amines include primary alkanolamines such as monoethanolamine, aminoethylethanolamine, monoisopropanolamine, N-(2-hydroxypropyl)-ethylenediamine, 2-amino-1-butanol, 2-amino-2-methyl-1-propanol, 3-amino-1-propanol, 2-amino-2-methyl-1,3-propanediol, 2-amino-2-methyl-1,3-propanediol, 2-amino-2-ethyl-1,3-propanediol, and tris (hydroxyethyl)-aminomethane, secondary alkanolamines such as diethanolamine, methylethanolamine, butylethanolamine, N-acetylethanolamine, and diisopropanolamine, tertiary alkanolamines such as triethanolamine, methyl diethanolamine, dimethylethanolamine, diethylethanolamine, ethyldiethanolamine, and triisopropanolamine, primary alkylamines such as methylamine, ethylamine, isobutylamine, t-butylamine, and cyclohexylamine, secondary alkylamines such as dimethylamine, diethylamine, diisopropylamine, and tertiary alkylamines such as trimethylamine.

These amines can be used singly, or can be used in combination of two or more.

As the ammonia and/or amines, ammonia is preferable.

In other words, the acid group of the above-described polymer is preferably neutralized by ammonia.

Ammonia has excellent volatility in comparison with amines, and thus can more efficiently be removed in the drying step described below. Therefore, the water-resistant property of the release film (described below) can be improved.

The blending ratio of the ammonia and/or amines is adjusted so that the percentage of neutralization falls within a predetermined range.

The percentage of neutralization is a ratio (molar ratio) of the number of moles of the ammonia and/or the number of moles of the amino group contained in the amines (the total number of the moles of the ammonia and the moles of the amino group contained in the amines when ammonia and amines are used in combination) to one mole of the acid group contained in the above-described polymer.

More specifically, to achieve excellent water-resistant property, releasability, and product contamination resistance, the percentage of neutralization (ammonia and/or amino group/acid group) of the acid group in the polymer is, for example, 40 mol % or more, preferably 60 mol % or more, more preferably 80 mol % or more, even more preferably 90 mol % or more, and, for example, 150 mol % or less, preferably 120 mol % or less, more preferably 110 mol % or less, even more preferably 100 mol % or less.

When the percentage of neutralization is within the above-described range, the water-resistant property and releasability of the release film (described below) can be improved. Thus, contamination and damage to the resin product (described below) are suppressed.

In this method, the above-described ammonia and/or amines (neutralizer) is blended with the above-described polymer at one time or in batches, and, as necessary, the mixture is kept at a predetermined temperature.

The temperature condition for the neutralization is, for example, 10° C. or more, preferably 20° C. or more, more preferably 40° C. or more, and, for example, 100° C. or less, preferably 80° C. or less. The neutralization is carried out for, for example, 0.5 hours or more, preferably 1 hour or more, and, for example, 10 hours or less, preferably 5 hours or less.

In this manner, the acid group of the above-described polymer is neutralized by the ammonia and/or amines, thereby producing a solution of the neutralized polymer (a polymer neutralized product).

The polymer neutralized product has a weight-average molecular weight approximately equal to the weight-average molecular weight of the polymer before the above-described neutralization.

The polymer neutralized product has a glass transition temperature approximately equal to the glass transition temperature of the polymer before the above-described neutralization.

In this method, as necessary, the above-described solvent is added or removed to adjust the content ratio (solid content concentration) of the polymer neutralized product in the above-described solution.

In this manner, a release agent is produced as a solution of the polymer neutralized product.

The content ratio of the polymer neutralized product to the total amount of the release agent is, for example, 1% by mass or more, preferably 5% by mass or more, and, for example, 50% by mass or less, preferably 40% by mass or less.

The release agent can further contain an additive.

Examples of the additive include non-reactive emulsifiers (other than the reactive emulsifier), release agents (such as known demolding agents and peeling accelerators) other than the above-described polymer, and further include pigments, drying agents, antirust agents, plasticizers, coating surface conditioners, oxidant inhibitors, ultraviolet absorbers, antifoam agents, and preservative agents. These can be used singly, or can be used in combination of two or more. The blending ratio of the additive is appropriately set depending on the purpose and use.

Examples of the non-reactive emulsifier include anion emulsifiers, cation emulsifiers, and non-ionic emulsifiers.

Examples of the anion emulsifier include sodium lauryl sulfate, ammonium lauryl sulfate, sodium dodecylbenzenesulfonate, sodium polyoxyethylene alkyl ether sulfonate, sodium polyoxyethylene alkylphenyl ether sulfonate, ammonium polyoxyethylene alkylphenyl ether sulfonate, and sodium polyoxyethylene alkyl sulfosuccinate. These can be used singly, or can be used in combination of two or more.

Examples of the cation emulsifier include alkyltrimethylammonium chloride. These can be used singly, or can be used in combination of two or more.

Examples of the non-ionic emulsifier include polyoxyethylene alkylether, polyoxyethylene alkylphenylether, polyoxyethylene fatty acid ester, and polyoxyethylene polyoxypropylene block polymer. These can be used singly, or can be used in combination of two or more.

These non-reactive emulsifiers can be used singly, or can be used in combination of two or more.

The content ratio of the non-reactive emulsifier to 100 parts by mass of the above-described polymer is, for example, 2.80 parts by mass or less, preferably 2.00 parts by mass or less, more preferably 1.00 part by mass or less.

In view of the water-resistant property, preferably, the release agent does not contain a non-reactive emulsifier.

Such a release agent includes a polymer having the acid group neutralized by ammonia and/or amines in a polymer of the polymerizable component containing a (meth)acrylate having a long-chain alkyl group and an acid group-containing ethylenic unsaturated bond-containing monomer.

Thus, the above-described polymer in the release agent has affinity for the metal base material, which is derived from the acid group, and separability from the polar group-containing resin, which is derived from the long-chain alkyl group.

The acid group of the release agent is neutralized by ammonia and/or amines. The ammonia and/or amines are/is easily volatilized and removed during the drying of the release agent. Thus, the acid group of the release agent neutralized by the ammonia and/or amines allows for the formation of a release film having excellent water-resistant property and releasability in comparison with an acid group neutralized by sodium ions that are difficult to volatilize.

As a result, the above-described release agent can suppress contamination and damage to a resin product made of a polar group-containing resin.

Next, a method of producing a resin product made of a polar group-containing resin is described in detail.

The polar group-containing resin is a resin containing a polar group in the molecular chain.

Examples of the polar group include known polar groups such as carbonyl groups, hydroxyl groups, sulfonate groups, amino groups, amide groups, imide groups, halogeno groups, and urethane groups. These can be used singly, or can be used in combination of two or more.

More specifically, examples of the polar group-containing resin include PVA (polyvinyl alcohol), PVP (polyvinyl pyrrolidone), TCA (cellulose triacetate), PVC (polyvinyl chloride), PI (polyimide), PC (polycarbonate), PPO (polyphenylene oxide), PAI (polyamide imide), PEI (polyether imide), PU (polyurethane), PRA (polyarylate), PSF (polysulfone), aramid, APA (fully aromatic polyamide), PPA (polyparabanic acid), POD (polyoxadiazole), and cellophane.

These polar group-containing resins can be used singly, or can be used in combination of two or more.

As the polar group-containing resin, PVA (polyvinyl alcohol) is preferable.

Examples of the resin product include products of the above-described polar group-containing resins. More specifically, the examples include films and molded products, and a film is preferable.

The film is not especially limited, and is produced by, for example, a solution film forming method (a cast method).

Hereinafter, a method of producing a film as the resin product is described in detail.

In this method, first, a release film is formed from the above-described release agent on a surface of the metal base material (release film formation step).

In the formation of the release film, for example, the above-described release agent is applied and dried on the surface of the metal base material. In this manner, the release film is formed as a dried coating film made of the release agent.

The metal base material is not especially limited as long as the metal base material can be used for producing a film as a resin product. Examples of the metal base material include a stainless drum, a stainless belt, an iron mold, a steel mold, a copper-alloy mold, and a mold made of an aluminum alloy.

The application method is not especially limited, and examples thereof include known application methods including applications using a commonly used machine such as a roll coater, a bar coater, a doctor blade, a Mayer bar, or an air knife; screen printing; offset printing; flexo printing; brush coating; spray coating; gravure coating; and reverse gravure coating.

The drying conditions are not especially limited. The drying is carried out at a heating temperature of, for example, 40° C. or more, preferably 60° C. or more, and, for example, 200° C. or less, preferably 180° C. or less, and for a heating time of, for example, 0.5 minutes or more, preferably 1 minute or more and, for example, 60 minutes or less, preferably 30 minutes or less.

In this manner, the release film is formed on the surface of the metal base material.

The application amount of the release agent is not especially limited and is, for example, 0.01 g/m$^2$ or more, preferably 0.05 g/m$^2$ or more, and, for example, 2 g/m$^2$ or less, preferably 1 g/m$^2$ or less as the release film (after being dried).

Next, in this method, while the polar group-containing resin is in contact with the release film, the polar group-containing resin is shaped (resin shaping step).

More specifically, for example, the above-described polar group-containing resin (preferably, polyvinyl alcohol) is dissolved in the above-described water-based solvents (preferably, water), thereby preparing a solution of the polar group-containing resin.

The concentration of the polar group-containing resin is not especially limited, and is, for example, 1% by mass or more, preferably 5% by mass or more, and, for example, 50% by mass or less, preferably 40% by mass or less.

In this method, then, the polar group-containing resin solution is applied and dried on a surface of the release film.

The method of applying the resin solution is not especially limited, and the above-described known application method is employed.

The drying conditions are not especially limited. The drying is carried out at a heating temperature of, for example, 40° C. or more, preferably 60° C. or more, and, for example, 200° C. or less, preferably 180° C. or less, and for a heating time, for example, 0.5 minutes or more, preferably 1 minute or more, and, for example, 60 minutes or less, preferably 30 minutes or less.

In this manner, a film of the polar group-containing resin is formed as a dried coating film made of the polar group-containing resin solution on the surface of the release film.

The application amount of the resin solution is not especially limited, and adjusted so that the film has a desired thickness.

The thickness of the film is not especially limited, and appropriately set depending on the purpose and use.

Thereafter, in this method, the produced polar group-containing resin film is released from the metal base material and release film (release step).

More specifically, in this method, the polar group-containing resin film is peeled from the release film formed on the surface of the metal base material.

In this method, a film is produced as the resin product of the polar group-containing resin.

The above-described method of producing a resin product uses the above-described release agent, and thus can suppress contamination and damage to the resin product.

In other words, the above-described release agent includes a polymer having the acid group neutralized by ammonia and/or amines in a polymer of the polymerizable component containing a (meth)acrylate having a long-chain alkyl group and an acid group-containing ethylenic unsaturated bond-containing monomer.

As described above, when the acid group of the release agent is neutralized by ammonia and/or amines, the ammonia and/or amines are/is easily volatilized and removed during the drying of the release agent.

Thus, the acid group of the release agent neutralized by ammonia and/or amines allows for the formation of a release film having excellent water-resistant property and releasability in comparison with an acid group neutralized by sodium ions that are difficult to neutralize.

Then, the formed release film is oriented and disposed so that the acid group contained in the polymer of the release film faces the metal base material side while the long-chain alkyl group faces the opposite side to the metal base material.

More specifically, the acid group contained in the polymer of the release film has a relatively high affinity for the metal base material. Thus, the acid group is absorbed and fixed to the metal base material while the release film is disposed so that the acid group faces the metal base material side.

Thus, when the polar group-containing resin is shaped on the surface of the release film and the resin product is separated from the release film (by demolding or peeling), the release film is fixed by the acid group and the release of the release film from the metal base material can be suppressed. As a result, the above-described release film can remain on the surface of the metal base material.

While the acid group faces the metal base material side, the long-chain alkyl group, which is also contained in the release film, extends toward the opposite side to the metal base material because the long-chain alkyl group has a lower affinity for the metal base material than the acid group does.

Thus, when the polar group-containing resin is shaped while being in contact with the release film, the resin product is in contact with the long-chain alkyl group of the release film.

In such a case, the polar group of the resin product has a relatively low affinity for the long-chain alkyl group of the release film. This allows the resin product made of the polar group-containing resin to be easily released (demolded, or peeled) from the release film.

The film exemplifies the resin product in the above description. However, the resin product may be, for example, a molded product.

The molding method of the molded product is not especially limited. Examples thereof include known molding methods such as an injection molding method, an injection compression molding method, an extrusion molding method, a transfer molding method, a hollow blow molding method, a gas assist blow molding method, a blow molding method, and an extrusion blow molding method.

In the production of the molded product, for example, a known mold (molding die) is prepared as the metal base material, and the above-described release agent is applied and dried on the internal surface of the mold, thereby forming the release film.

Next, in this method, the above-described polar group-containing resin is molded while being in contact with the release film in the mold. Thereafter, the molded product is released from the metal base material.

More specifically, in this method, the polar group-containing resin-molded product is demolded from the release film, which is formed on the surface of the mold used as the metal base material.

Also by such a method, the resin product (molded product) of the polar group-containing resin can easily be released from the release film formed on the internal surface of the mold.

Thus, the above-described release agent and method of producing a resin product can suitably be used in industry fields, for example, packaging industry, electronic device industry, optical device industry, and plastic car parts industry.

EXAMPLES

Next, the present invention is described with reference to Examples and Comparative Examples. The present invention is not limited to the following Examples. The "parts" and "%" are based on mass unless otherwise specified. The specific numeral values used in the description below, such as blending ratio (content ratio), physical property values, and parameters, can be replaced with the corresponding blending ratio (content ratio), physical property values, and parameters in the above-described "DESCRIPTION OF THE EMBODIMENT", including the upper limit values (numeral values defined with "or less", and "less than") or the lower limit values (numeral values defined with "or more", and "more than").

<Polymer Neutralized Product>

Example 1

A four-neck flask equipped with a stirrer, a thermometer, and a reflux tube was charged with 25 parts by mass of a lauryl methacrylate (LMA), 20 parts by mass of a stearyl methacrylate (SMA), 40 parts by mass of n butyl methacrylate (nBMA), 15 parts by mass of acrylic acid (AA), 4 parts by mass of n-dodecylmercaptan (NDM) used as chain transfer agent, and 35 parts by mass of a propylene glycol monomethyl ether (PGME) used as a solvent, and the mixture was stirred.

Next, the inside of the flask was heated to 95° C., 5 parts by mass of an azo compound (trade name; ABN-E, 2,2'-azobis (2-methylbutyronitrile), manufactured by JAPAN FINECHEM COMPANY, INC.) was added as a polymerization initiator thereto, and the mixture was reacted at 95° C. for 4 hours. In this manner, a polymer was produced.

Next, 14.5 parts by mass of a 25% by mass ammonia water and 350 parts by mass of deionized water were added to the produced polymer to neutralize the acid group (carboxy group) in the polymer with the ammonia.

In this manner, a release agent containing the above-described polymer neutralized product.

The solid content concentration of the release agent was 20% by mass, and the percentage of neutralization (the ratio of the number of moles of the ammonia to the number of moles of the acid group in the polymer) was 100 mol %.

Examples 2 to 21

A release agent containing the polymer neutralized product was produced in the same manner as Example 1 except that the formulation was changed according to Tables 1 to 3.

Comparison Example 1

A four-neck flask equipped with a stirrer, a thermometer, and a reflux tube was charged with 385 parts by mass of deionized water and 10 parts by mass of sodium dodecylbenzene sulfonate used as a non-reactive emulsifier, and the mixture was stirred.

Next, the flask was further charged with 35 parts by mass of a stearyl methacrylate (SMA), 60 parts by mass of an isobornylmethacrylate (IBXMA), 5 parts by mass of acrylic acid (AA), and 4 parts by mass of n-dodecyl mercaptan (NDM) used as a chain transfer agent, and the mixture was stirred.

Next, the inside of the flask was heated to 80° C., 5 parts by mass of potassium persulfate (KPS) was added as a polymerization initiator, and the mixture was reacted at 80° C. for 4 hours.

In this manner, a polymer and a release agent were produced. The solid content concentration of the release agent was 22% by mass.

Comparison Example 2

A four-neck flask equipped with a stirrer, a thermometer, and a reflux tube was charged with 385 parts by mass of deionized water and 10 parts by mass of sodium alkyl allyl sulfosuccinate used as a reactive emulsifier, and the mixture was stirred.

Next, the flask was further charged with 35 parts by mass of a stearyl meth acrylate (SMA), 60 parts by mass of an isobornyl methacrylate (IBXMA), 5 parts by mass of acrylic acid (AA), and 4 parts by mass of n-dodecyl mercaptan (NDM) as a chain transfer agent, and the mixture was stirred.

Next, the inside of the flask was heated to 80° C., 5 parts by mass of potassium persulfate (KPS) was added as polymerization initiator thereto, and the mixture was reacted at 80° C. for 4 hours.

In this manner, a polymer and a release agent were produced. The solid content concentration of the release agent was 21% by mass.

Comparison Example 3

A release agent containing the polymer neutralized product was produced in the same manner as Example 1 except that sodium hydroxide was used in place of the ammonia to neutralize the acid group (carboxy group) in the polymer.

<Properties>

(1) Weight-Average Molecular Weight

The weight-average molecular weight of the polymer before the neutralization of the acid group was measured under the following conditions. The results are shown in Tables.

In other words, the polymer (sample) before the neutralization of the acid group was dissolved in tetrahydrofuran, and the molecular weight distribution of the sample was measured by gel permeation chromatograph (GPC).

Thereafter, the weight-average molecular weight (Mw) of the sample was calculated from the obtained chromatogram (chart) using a calibration curve based on standard polystyrene. The measurement device and the measurement conditions are described as follows.

Device: GPC-101 (manufactured by Showa Denko K.K.)
Flow rate: 1.0 mL/min
Developing solvent: tetrahydrofuran (THF)
Column type: GPC KF-806L (manufactured by Showa Denko K.K.), KF-802 (manufactured by Showa Denko K.K.)
Column temperature: 40° C.
Sample concentration: 0.2% by mass
Detector: RI
Reference sample: monodispersed polystyrene (manufactured by Showa Denko K.K.)

(2) Acid Value

The acid value of the polymer before the neutralization of the acid group was calculated based on the formulation of each of Examples and Comparison Examples.

(3) Glass Transition Temperature

The glass transition temperature of the polymer before the neutralization of the acid group was calculated based on the formulation of each of Examples and Comparison Examples and a FOX formula (the following formula (1)).

$$1/Tg = W_1/Tg_1 + W_2/Tg_2 + \ldots + W_n/Tg_n \quad (1)$$

In the above-described formula (1), Tg represents the glass transition temperature (unit: K) of the polymer before the neutralization of the acid group, $Tg_i$ (i=1, 2, ... n) represents the glass transition temperature (unit: K) when each monomer i of the polymerizable component forms a homopolymer, and $W_i$ (i=1, 2, ... n) represents the mass fraction of each of the monomers i in the whole of the polymerizable component.

(4) C log P (Poly)

The C log P (poly) value of the polymer before the neutralization of the acid group was calculated using the formulation of each of Examples and Comparison Examples in the following manner.

In other word, the values calculated by ChemBioDraw Ultra 14.0 (Cambridge corporation) were used as the C log P values of the monomers in the polymerizable component.

The C log P (poly) of the polymer before the neutralization of the acid group was calculated from the following formula (1).

$$C \log P(\text{poly}) = C \log P \text{ of Monomer } A \times \text{Composition Ratio of Repeat Unit } A + C \log P \text{ of Monomer } B \times \text{Composition Ratio of Repeat Unit } B + \ldots \quad (1)$$

<Evaluations>

(1) Water-Resistant Property

The release agent obtained in each of Examples and Comparison Examples was diluted with distilled water to have a solid content concentration of 5% by mass. Thereafter, the diluted release agent was applied to a test piece made of a stainless-steel (SUS 304) with a bar coater (No. 3), and dried at 80° C. for 5 minutes in a dryer. In this manner, a release film was formed on the test piece.

Next, the contact angle of the formed release film and the 5 μL distilled water was measured with an automated contact angle meter (DMs-601, manufactured by Kyowa Interface Science Co., Ltd.).

The results are shown in Tables.

(2) Releasability

The release agent obtained in each of Examples and Comparison Examples was diluted with distilled water to have a solid content concentration of 5% by mass. Thereafter, the diluted release agent was applied to a test piece made of a stainless-steel (SUS 304) with a bar coater (No. 3), and dried at 80° C. for 5 minutes in a dryer. In this manner, a release film in an amount of 0.5 g/m² (after being dried) was formed on the test piece.

Next, a 10% by mass polyvinyl alcohol solution was applied to the formed release film with a bar coater (No. 36), and dried at 100° C. for 5 minutes. In this matter, a polyvinyl alcohol film with a thickness of 10 μm was formed.

Thereafter, the peeling strength of the formed film was measured with a peeling tester (TE-1003 manufactured by TESTER SANGYO CO., LTD.). The peeling angle was 180 degrees and the peeling rate was 10 mm/min. The results are shown in Tables.

The criteria of the evaluation are described as follow.

A+: less than 10 mN/cm
A: 10 mN/cm or more and less than 40 mN/cm
B+: 40 mN/cm or more and less than 70 mN/cm
B: 70 mN/cm or more and less than 100 mN/cm
C: 100 mN/cm or more (3) Product Contamination Resistance After the peeling test of the above-described (2) Releasability, a surface of the polyvinyl alcohol film that was in contact with the release film was analyzed with a fourier-transform infrared spectrometer (FTIR-4600 manufactured by JASCO Corporation).

The intensity of the infrared absorption derived from the release film (in proximity to 2850 cm$^{-1}$) and the intensity of the infrared absorption derived from the polyvinyl alcohol film (in proximity to 1086 cm$^{-1}$) were compared and evaluated by the following criteria. The results are shown in Tables.

A: the infrared absorption derived from the release film was not confirmed.
B: the intensity of the infrared absorption derived from the release film < the intensity of the infrared absorption derived from the polyvinyl alcohol film
C: the intensity of the infrared absorption derived from the release film ≥ the intensity of the infrared absorption derived from the polyvinyl alcohol film A specific example of the IR chart on A to C scale is shown in FIG. 1.

The grade A of the IR chart is the evaluation result of Example 3 in FIG. 1.

The grade B of the IR chart is the evaluation result of Example 19 in FIG. 1.

The grade C of the IR chart is the evaluation result of Comparison Example 3 in FIG. 1.

TABLE 1

| | Formulation (parts by mass) | | | | | | | | | | | | | |
|---|---|---|---|---|---|---|---|---|---|---|---|---|---|---|
| | Long-chain alkyl (meth)acrylate | | | | | Short-chain alkyl (meth)acrylate | | | | | Acid group-containing ethylenic unsaturated bond-containing monomer | | | |
| | | | | | | | | | IBX | | | | Phosphoric | |
| No. | LMA | SMA | SA | VA | Total | 2EHA | 2EHMA | nBMA | iBMA | MA | Total | AA | MAA | acid A | Total |
| Ex. 1 | 25 | 20 | — | — | 45 | — | — | 40 | — | — | 40 | 15 | — | — | 15 |
| Ex. 2 | 25 | 25 | — | — | 50 | — | — | — | 35 | — | 35 | 15 | — | — | 15 |
| Ex. 3 | — | 65 | — | — | 65 | — | 20 | — | — | — | 20 | 15 | — | — | 15 |
| Ex. 4 | — | 65 | — | — | 65 | — | 10 | — | — | 10 | 20 | 15 | — | — | 15 |
| Ex. 5 | — | 55 | — | — | 55 | — | — | — | — | 30 | 30 | 15 | — | — | 15 |
| Ex. 6 | — | 55 | — | — | 55 | — | — | — | — | 30 | 30 | 15 | — | — | 15 |

TABLE 1-continued

| | Formulation (parts by mass) | | | | | | | | | | | | | |
|---|---|---|---|---|---|---|---|---|---|---|---|---|---|---|
| | Long-chain alkyl (meth)acrylate | | | | | Short-chain alkyl (meth)acrylate | | | | | | Acid group-containing ethylenic unsaturated bond-containing monomer | | |
| | | | | | | | | | | IBX | | | Phosphoric | |
| No. | LMA | SMA | SA | VA | Total | 2EHA | 2EHMA | nBMA | iBMA | MA | Total | AA | MAA | acid A | Total |
| Ex. 7 | — | 45 | — | — | 45 | — | — | — | — | 40 | 40 | 15 | — | — | 15 |
| Ex. 8 | — | 20 | — | 25 | 45 | — | — | — | — | 40 | 40 | 15 | — | — | 15 |
| Ex. 9 | — | 25 | — | — | 25 | — | — | — | — | 60 | 60 | 15 | — | — | 15 |
| Ex. 10 | — | 20 | — | — | 20 | — | — | — | — | 60 | 60 | 20 | — | — | 20 |
| Ex. 11 | — | 25 | — | — | 25 | — | — | — | — | 60 | 60 | — | 15 | — | 15 |
| Ex. 12 | — | 25 | — | — | 25 | — | — | — | — | 60 | 60 | 14.5 | — | 0.5 | 15 |
| Ex. 13 | — | 25 | — | — | 25 | — | — | — | — | 60 | 60 | 14 | — | 1 | 15 |
| Ex. 14 | — | 25 | — | — | 25 | — | — | — | — | 60 | 60 | 15 | — | — | 15 |
| Ex. 15 | — | 30 | — | — | 30 | — | — | — | — | 60 | 60 | 10 | — | — | 10 |
| Ex. 16 | — | 35 | — | — | 35 | — | — | — | — | 35 | 35 | 30 | — | — | 30 |
| Ex. 17 | — | — | 60 | — | 60 | 25 | — | — | — | — | 25 | 15 | — | — | 15 |
| Ex. 18 | 25 | 20 | — | — | 45 | — | 40 | — | — | — | 40 | 15 | — | — | 15 |
| Ex. 19 | — | 85 | — | — | 85 | — | — | — | — | — | — | 15 | — | — | 15 |
| Ex. 20 | — | 25 | — | — | 25 | — | — | — | — | 60 | 60 | 15 | — | — | 15 |
| Ex. 21 | — | 25 | — | — | 25 | — | — | — | — | 60 | 60 | 15 | — | — | 15 |
| Comp. Ex. 1 | — | 35 | — | — | 35 | — | — | — | — | 60 | 60 | 5 | — | — | 5 |
| Comp. Ex. 2 | — | 35 | — | — | 35 | — | — | — | — | 60 | 60 | 5 | — | — | 5 |
| Comp. Ex. 3 | — | 25 | — | — | 25 | — | — | — | — | 60 | 60 | 15 | — | — | 15 |

TABLE 2

| | | | | | Formulation (parts by mass) | | | | | | | |
|---|---|---|---|---|---|---|---|---|---|---|---|---|
| | | | | | | | Polymerization initiator | | Chain transfer agent | | Neutralizer | |
| | | | | | Formulation (parts by mass) | | | Adding amount | | Adding amount | | Percentage of |
| No. | Tg (°C.) | Acid value (mgKOH/g) | ClpgP (Poly) | Solvent | Non-reactive emulsifier A | Reactive emulsifier B | Type | (% to monomer) | Type | (% to monomer) | Type of neutralizer | neutralization (%) |
| Ex. 1 | 11 | 117 | 3.26 | PGME | — | — | ABN-E | 1 | NDM | 0.5 | NH3 | 100 |
| Ex. 2 | 18 | 117 | 3.40 | PGME | — | — | ABN-E | 1 | NDM | 0.5 | NH3 | 100 |
| Ex. 3 | 35 | 117 | 4.95 | PGME | — | — | ABN-E | 1 | NDM | 0.5 | NH3 | 100 |
| Ex. 4 | 51 | 117 | 4.98 | PGME | — | — | ABN-E | 1 | NDM | 0.5 | NH3 | 100 |
| Ex. 5 | 81 | 117 | 4.71 | PGME | — | — | ABN-E | 1 | NDM | 0.5 | NH3 | 100 |
| Ex. 6 | 81 | 117 | 4.71 | PGME | — | — | ABN-E | 5 | NDM | 4 | NH3 | 100 |
| Ex. 7 | 94 | 117 | 4.43 | PGME | — | — | ABN-E | 5 | NDM | 4 | NH3 | 100 |
| Ex. 8 | 97 | 117 | 4.54 | PGME | — | — | ABN-E | 5 | NDM | 4 | NH3 | 100 |
| Ex. 9 | 123 | 117 | 3.91 | PGME | — | — | ABN-E | 5 | NDM | 4 | NH3 | 100 |
| Ex. 10 | 128 | 156 | 3.35 | PGME | — | — | ABN-E | 5 | NDM | 4 | NH3 | 100 |
| Ex. 11 | 127 | 100 | 4.25 | PGME | — | — | ABN-E | 5 | NDM | 4 | NH3 | 100 |
| Ex. 12 | 123 | 116 | 3.93 | PGME | — | — | ABN-E | 5 | NDM | 4 | NH3 | 100 |
| Ex. 13 | 123 | 115 | 3.95 | PGME | — | — | ABN-E | 5 | NDM | 4 | NH3 | 100 |
| Ex. 14 | 123 | 117 | 3.91 | PGME | — | — | ABN-E | 5 | NDM | 4 | NH3 | 120 |
| Ex. 15 | 119 | 78 | 4.59 | PGME | — | — | ABN-E | 5 | NDM | 4 | NH3 | 100 |
| Ex. 16 | 105 | 233 | 2.91 | PGME | — | — | ABN-E | 5 | NDM | 4 | NH3 | 100 |
| Ex. 17 | −3 | 117 | 4.93 | PGME | — | — | ABN-E | 1 | NDM | 0.5 | NH3 | 100 |
| Ex. 18 | −1 | 117 | 4.05 | PGME | — | — | ABN-E | 1 | NDM | 0.5 | NH3 | 100 |
| Ex. 19 | 47 | 117 | 5.68 | PGME | — | — | ABN-E | 5 | NDM | 4 | NH3 | 100 |
| Ex. 20 | 123 | 117 | 3.91 | PGME | — | — | ABN-E | 5 | NDM | 4 | NH3 | 70 |
| Ex. 21 | 123 | 117 | 3.91 | PGME | — | — | ABN-E | 5 | NDM | 4 | NH3 | 50 |
| Comp. Ex. 1 | 114 | 39 | 5.44 | Water | 10 | — | KPS | 5 | NDM | 4 | — | — |
| Comp. Ex. 2 | 114 | 39 | 5.44 | Water | — | 10 | KPS | 5 | NDM | 4 | — | — |
| Comp. Ex. 3 | 123 | 117 | 3.91 | PGME | — | — | ABN-E | 5 | NDM | 4 | NaOH | 100 |

TABLE 3

| | | Evaluations | | | |
|---|---|---|---|---|---|
| | | Water-resistant property | | | |
| No. | Weight-average molecular weight | Contact angle (°) 1 second later | Contact angle (°) 30 seconds later | Releasability | Contamination resistance |
| Ex. 1 | 250000 | 95 | 95 | B | A |
| Ex. 2 | 250000 | 95 | 95 | B | A |
| Ex. 3 | 250000 | 95 | 95 | B+ | A |
| Ex. 4 | 250000 | 95 | 95 | B+ | A |
| Ex. 5 | 250000 | 95 | 95 | B+ | A |
| Ex. 6 | 100000 | 95 | 95 | A | A |
| Ex. 7 | 100000 | 95 | 95 | A | A |
| Ex. 8 | 100000 | 95 | 95 | A | A |
| Ex. 9 | 100000 | 105 | 105 | A+ | A |
| Ex. 10 | 100000 | 100 | 100 | A | A |
| Ex. 11 | 100000 | 105 | 105 | A+ | A |
| Ex. 12 | 100000 | 105 | 105 | A+ | A |
| Ex. 13 | 120000 | 105 | 105 | A+ | A |
| Ex. 14 | 100000 | 105 | 105 | A+ | A |
| Ex. 15 | 100000 | 105 | 105 | B+ | B |
| Ex. 16 | 100000 | 95 | 85 | B+ | B |
| Ex. 17 | 250000 | 100 | 99 | B | A |
| Ex. 18 | 250000 | 100 | 99 | B | A |
| Ex. 19 | 100000 | 100 | 90 | B | B |
| Ex. 20 | 100000 | 105 | 105 | A | A |
| Ex. 21 | 100000 | 100 | 90 | B | B |
| Comp. Ex. 1 | 100000 | 100 | 70 | C | C |
| Comp. Ex. 2 | 100000 | 100 | 75 | C | C |
| Comp. Ex. 3 | 100000 | 100 | 80 | C | C |

LMA: lauryl methacrylate
SMA: stearyl methacrylate
SA: stearyl acrylate
VA: behenyl acrylate
2EHA: 2-ethylhexylacrylate
2EHMA: 2-ethylhexylmethacrylate
nBMA: n-butylmethacrylate
iBMA: isobutylmethacrylate
IBXMA: isobornylmethacrylate
AA: acrylic acid
Phosphoric acid A: 2-acryloyloxy ethyl acid phosphate
PGME: propylene glycol monomethylether
ABN-E: 2,2'-azobis (2-methylbutyronitrile), manufactured by JAPAN FINECHEM COMPANY, INC. NDM: n-dodecylmercaptan
KPS: potassium persulfate
Non-reactive emulsifier A: sodium dodecylbenzenesulfonate
Reactive emulsifier B: sodium alkyl allyl sulfosuccinate
$NH_3$: ammonia
NaOH: sodium hydroxide While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The release agent of the present invention and method of producing a resin product of the present invention are suitably used for packaging industry, electronic device industry, optical device industry, and plastic car parts industry.

The invention claimed is:

1. A release agent comprising:
    a polymer of a polymerizable component containing a (meth)acrylate having a long-chain alkyl group with carbon atoms of 12 to 22 and an acid group-containing ethylenic unsaturated bond-containing monomer, wherein the acid group is neutralized by ammonia and/or amines, and
    wherein the polymer has a glass transition temperature of 25° C. or more.
2. The release agent according to claim 1, wherein
    the polymer has an acid value of 80 mgKOH/g or more and 200 mgKOH/g or less.
3. The release agent according to claim 1, wherein
    the polymer has a weight-average molecular weight of 3,000 or more and 220,000 or less.
4. The release agent according to claim 1, wherein
    the acid group is neutralized by ammonia.
5. The release agent according to claim 1, wherein
    a percentage of neutralization of the acid group is 60 mol % or more.
6. The release agent according to claim 1, wherein
    the acid group-containing ethylenic unsaturated bond-containing monomer contains a phosphate group-containing (meth)acrylate.
7. The release agent according to claim 1, wherein
    a ratio of the acid group-containing ethylenic unsaturated bond-containing monomer to a total amount of the polymerizable component is 5% by mass or more and 25% by mass or less.
8. The release agent according to claim 1, the release agent being used to shape a polar group-containing resin.
9. A method of producing a resin product, the method comprising:
    a step of forming a release film of the release agent according to claim 1 on a surface of the metal base material;
    a step of shaping a polar group-containing resin while the polar group-containing resin is in contact with the release film; and
    a step of releasing a product of the polar group-containing resin from the metal base material.
10. A release agent comprising:
    a polymer of a polymerizable component containing a (meth)acrylate having a long-chain alkyl group with carbon atoms of 12 to 22 and an acid group-containing ethylenic unsaturated bond-containing monomer,
    wherein the acid group is neutralized by ammonia and/or amines, and
    wherein the polymer has a weight-average molecular weight of 3,000 or more and 220,000 or less.
11. The release agent according to claim 10, wherein the polymer has an acid value of 80 mgKOH/g or more and 200 mgKOH/g or less.
12. The release agent according to claim 10, wherein
    the acid group is neutralized by ammonia.
13. The release agent according to claim 10, wherein
    a percentage of neutralization of the acid group is 60 mol % or more.
14. The release agent according to claim 10, wherein
    the acid group-containing ethylenic unsaturated bond containing monomer contains a phosphate group-containing (meth)acrylate.

15. The release agent according to claim 10, wherein
a ratio of the acid group-containing ethylenic unsaturated bond-containing monomer to a total amount of the polymerizable component is 5% by mass or more and 25% by mass or less.

16. The release agent according to claim 10, the release agent being used to shape a polar group-containing resin.

17. A method of producing a resin product, the method comprising:
a step of forming a release film of the release agent according to claim 10 on a surface of the metal base material;
a step of shaping a polar group-containing resin while the polar group-containing resin is in contact with the release film; and
a step of releasing a product of the polar group containing resin from the metal base material.

\* \* \* \* \*